Nov. 15, 1960  E. F. GILLETTE  2,960,232
SWIMMING POOL FILTER
Filed Dec. 15, 1958  2 Sheets-Sheet 1

INVENTOR.
EDWARD F. GILLETTE
BY
H. G. Manning
ATTORNEY.

Nov. 15, 1960 — E. F. GILLETTE — 2,960,232
SWIMMING POOL FILTER

Filed Dec. 15, 1958 — 2 Sheets-Sheet 2

INVENTOR.
EDWARD F. GILLETTE
BY H. G. Manning
ATTORNEY

2,960,232

SWIMMING POOL FILTER

Edward F. Gillette, 130 Royal York Road S., Apt. 405, Toronto, Ontario, Canada

Filed Dec. 15, 1958, Ser. No. 780,332

1 Claim. (Cl. 210—169)

This invention relates to swimming pool filter plants and is directed particularly to improvements in the filtering units for such plants employing "filteraid" (diatomaceous earth) through which the pool water passes during the filtering process.

One object of this invention is to provide a pool filter of the character described, having a plurality of filtering units, each of which comprises a star-shaped copper wire mesh member fixed along a central guide tube, whereby greatly increased filtering area is obtained in comparison with ordinary cylindrical filter elements.

Another object of this invention is to provide an improved swimming pool filter of the above nature which comprises a tank within which the filtering units are vertically supported on short guide tubes extending up from the bottom of the tank, and including means to shut off the inlet conduit from the pool at the top of the tank and to open a drain valve at the bottom of the tank for emptying it with the circulating pump, whereby the filter units can readily be cleaned with a garden hose without removal.

Still another object of this invention is to provide a swimming pool filter system of the character described which will be low in initial cost, inexpensive to maintain, compact, easy to use, and efficient and durable in operation.

Other objects, features and advantages of the invention will be apparent from the following description when read with reference to the accompanying drawings.

In the drawings, wherein like parts are designated by the like reference numerals in each of the figures of the drawing.

Figure 1:
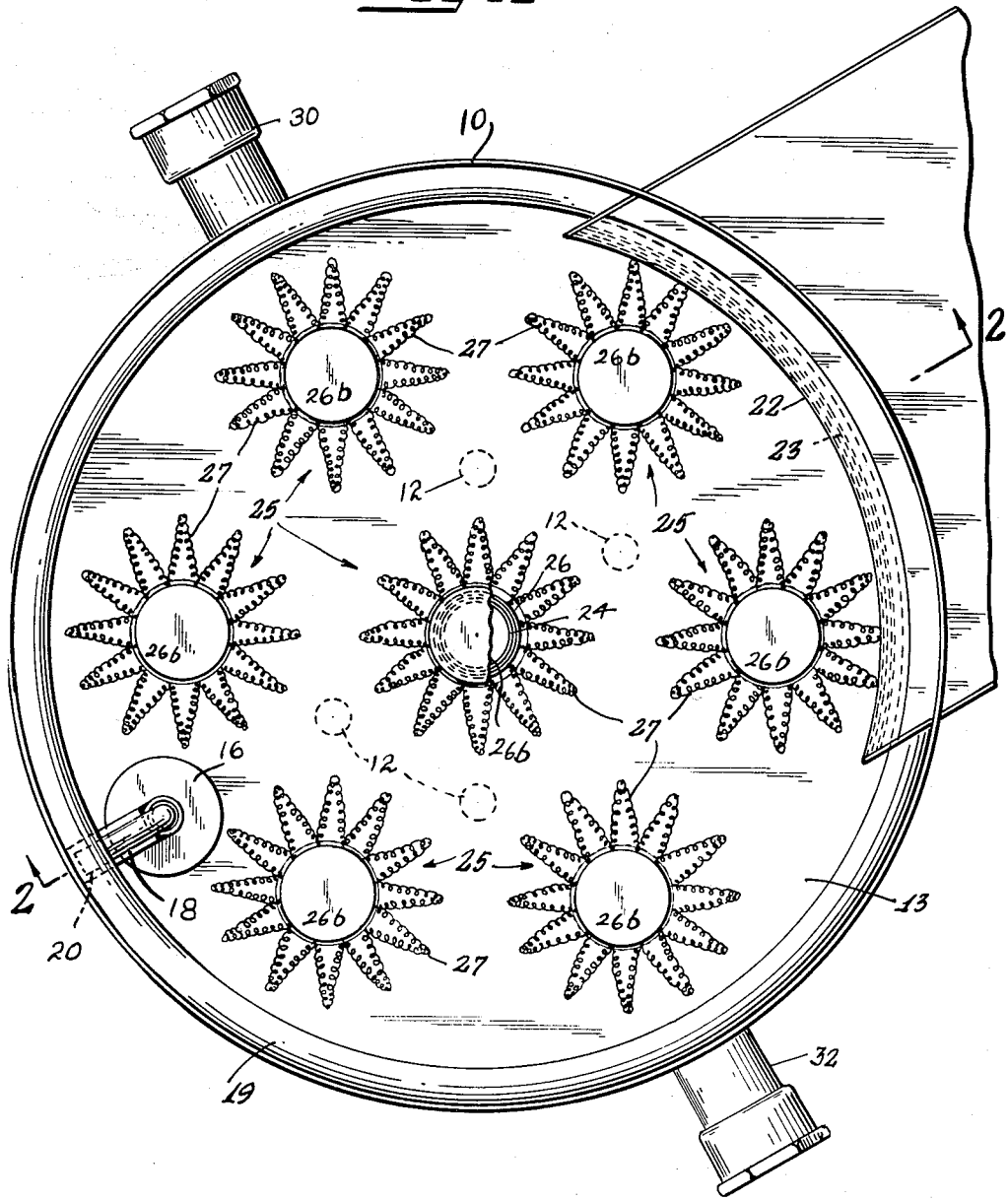
Fig. 1 is a top view of a swimming pool filter embodying the invention, the cover being removed to show the filtering units.

Referring now in detail to the drawings, reference numeral 10 designates a cylindrical tank, open at the top and having a bottom wall 11. Fixed within the lower end of the tank 10 and spaced from the bottom wall 11 thereof, as by cylindrical metal spacer blocks 12, is a horizontal partition wall 13. Depending from the tank bottom wall 11 is an outlet fitting 14 which connects with a circulating pump (not illustrated) which returns the filtered water to the pool.

Formed in the partition wall 13 in register with the outlet fitting 14 is a valve seat 15, which is normally closed by a disk drain valve head 16 fixed on the lower end of a valve rod 17. The valve rod 17 is arranged for vertical sliding motion in a pair of apertured tubular guide members 18 fixed in vertically-spaced relation against the inside wall of the tank 10.

Figure 2:
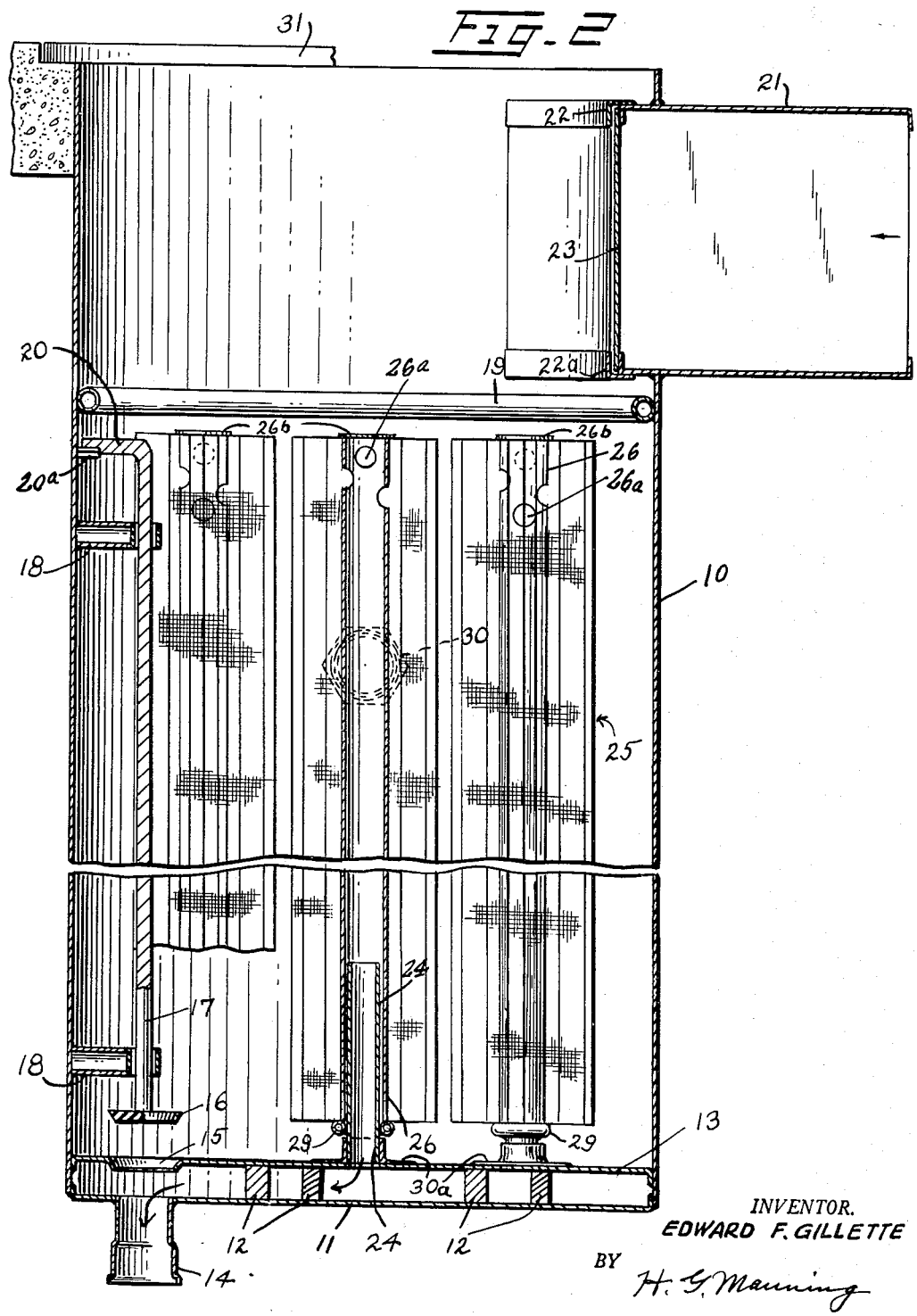
Fig. 2 is a vertical cross-sectional view of the tank, taken along the line 2—2 of Fig. 1, in the direction of the arrows.

The tank 10 is provided with a tubular strengthening rib 19, which may be of steel tubing for example, welded to the inside of the tank wall near its upper end. The upper end of the valve rod 17 is bent to provide a horizontal handle 20 to facilitate the manual lifting of the valve head 16 from its seat for draining the tank prior to cleaning the filtering units, as is hereinbelow described. The rod 17 is of such length, and the handle member 20 is of such size that while the tank is draining and being cleaned, the drain valve can be held open by turning said handle member to seat upon a ribbed bracket 20a welded to the tank 10, below the rib 19 as shown in Fig. 2.

Communicating with the upper end of the tank 10 provided with a cover 31, and extending through the side wall thereof is a large rectangular inlet conduit 21 which carries water from the swimming pool to the filter units. The inner end of the inlet conduit 21 is of arcuate shape to conform with the cylindrical side wall of the tank 10, and is provided along its upper and lower edges with horizontal guide channels 22, 22a within which is slidingly disposed a curved gate 23 which is normally open, but which, when cleaning the filter, is slid into closed position as shown in the drawings.

Arranged within the tank 10, and removably seated on a plurality of short guide tubes 24 seated in cupped disks 30a and extending upwardly from the partition wall 13 and opening into the space between said partition wall and the tank bottom wall 11, are a plurality of filtering units 25. The filtering units 25 comprise elongated support pipes 26 which fit over the guide tubes 24, and have a plurality of staggered round apertures 26a near their upper ends, and about the outer periphery of which are welded a plurality of elongated star-shaped copper wire mesh filter elements 27.

To provide the greatest filtering area in each of the filtering units 25, the filter elements 27 are preferably formed in the shape of twelve-point stars, as illustrated. Each of the filter elements 27 may also be covered on the outside with a filter cloth (not shown), though this is not necessary if they are constructed of fine enough wire mesh. The bottoms of the star-shaped filter units are bent inwardly to prevent the passage of unfiltered water. Each of the filtering units 25 is adapted to rest upon an annular stop member 29 welded about each outlet guide tube 24 for supporting said filtering units 25 in spaced relation above the partition wall 13 near the bottom of the tank. The support pipes 26 have metal caps 26b welded to the tops thereof.

The tank 10 is provided with a water inlet fitting 30 connected to the main outlet of the swimming pool.

A second auxiliary inlet pipe 32 is also provided on the side of the tank opposite the pipe 30, which pipe 32 is connected to a pool wall vacuum cleaner fitting of standard construction (not shown), which is used independently of the pool water filter when it is desired to manually clean the sides of the pool.

Operation

In the normal use of this improved pool filter system, the gate 23 at the tank end of the inlet conduit 21, carrying water from the pool drain outlet, will be in open position, and the drain valve head 16 will be seated upon the valve seat 15 in the partition wall 13 near the bottom of the tank. The water to be filtered will pass inwardly through each of the wire mesh filter elements 27, which may contain "filter aid," the apertures 26a of the support pipes 26, through the guide tubes 24, and out through the outlet fitting 14, to be returned to the pool in a continuous cycle.

When it becomes necessary to clean the filtering units 25, it will only be necessary to shut the gate 23 and open the drain valve 16, as illustrated in Fig. 2. Water from an ordinary garden hose may then be used to wash down the filtering units 25 without the necessity of removing them.

One advantage of the invention is that by the use of star-shaped filter elements, each filtering unit will contain the maximum amount of filter area.

While there is shown and described herein only one form in which this invention can conveniently be embodied in practice it is to be understood that this form is given by way of example only, and that various modifications may be made therein without departing from the basic invention. In short, this invention includes all equivalent forms of the invention coming within the scope and spirit of the following claim.

Having thus fully described the invention, what is claimed as new and for which it is desired to secure Letters Patent is:

In a filter for the water from a swimming pool, a tank having a flat bottom provided with an outlet, a top inlet for normally receiving water from said pool, a plurality of short outlet guide tubes extending upwardly at the bottom of said tank, a plurality of elongated filter support tubes surrounding said guide tubes respectively and extending upwardly to the top of said tank, said filter support tubes having side outlet apertures near the tops thereof, the portions of said filter support tubes below said apertures being imperforate, each of said support tubes being embraced by a fine mesh filter element whereby the water to be filtered normally passes inwardly through said filter element, and the apertures of said support tubes, down through said guide tubes and out through the bottom of said tank, said tank being provided with an outlet valve in the bottom thereof to permit it to be emptied so that the filter elements may be cleaned by a hose, said tank also having a movable gate at the top thereof to close off the supply of water while the filter is being cleaned.

References Cited in the file of this patent

UNITED STATES PATENTS

| | | |
|---|---|---|
| 427,568 | Halstead | May 13, 1890 |
| 502,690 | Andre | Aug. 1, 1893 |
| 550,979 | Kohlmeyer | Dec. 10, 1895 |
| 2,362,530 | Bennett | Nov. 14, 1944 |
| 2,548,400 | Shepard | Apr. 10, 1951 |
| 2,736,435 | Gardes et al. | Feb. 28, 1956 |
| 2,874,845 | Fain et al. | Feb. 24, 1959 |